United States Patent [19]

Lapple

[11] 4,097,092

[45] Jun. 27, 1978

[54] DISPERSER

[75] Inventor: Walter Christian Lapple, Alliance, Ohio

[73] Assignee: The Babcock & Wilcox Company, New York, N.Y.

[21] Appl. No.: 776,040

[22] Filed: Mar. 9, 1977

Related U.S. Application Data

[63] Continuation of Ser. No. 636,859, Dec. 2, 1975, abandoned.

[51] Int. Cl.² .............................................. B65G 53/28
[52] U.S. Cl. ........................................................ 302/25
[58] Field of Search ...................... 302/21, 23, 24, 25; 266/182

[56] References Cited

U.S. PATENT DOCUMENTS

| | | | |
|---|---|---|---|
| 1,082,113 | 12/1913 | Diden | 302/25 |
| 1,116,971 | 11/1914 | Barker | 302/25 |
| 1,152,302 | 8/1915 | Davenport | 302/25 |
| 1,341,010 | 5/1920 | Cartwright | 302/25 |
| 2,747,934 | 5/1956 | Fisher | 302/25 |
| 3,152,839 | 10/1964 | Edwards | 302/25 |
| 3,205,016 | 9/1965 | Panning | 302/23 |

FOREIGN PATENT DOCUMENTS

| | | | |
|---|---|---|---|
| 1,099,520 | 9/1955 | France | 302/23 |
| 1,264,373 | 3/1968 | Germany | 302/25 |

Primary Examiner—John J. Love
Assistant Examiner—Jeffrey V. Nase
Attorney, Agent, or Firm—Joseph M. Maguire; Robert J. Edwards

[57] ABSTRACT

An upright conduit and disperser which provide the acceleration and uniformity of particle dispersion required for a smooth transition from dense to dilute phase in the pneumatic conveyance of gas entrained particles.

2 Claims, 5 Drawing Figures

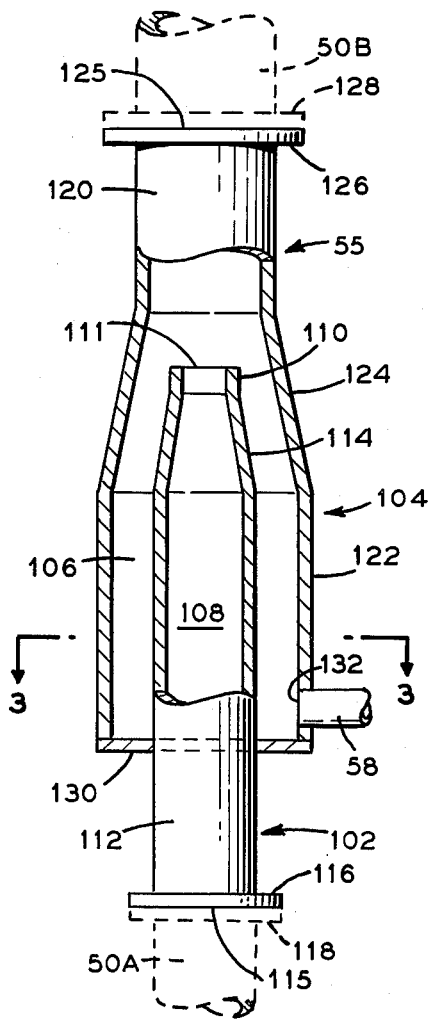
FIG. 2
FIG. 3
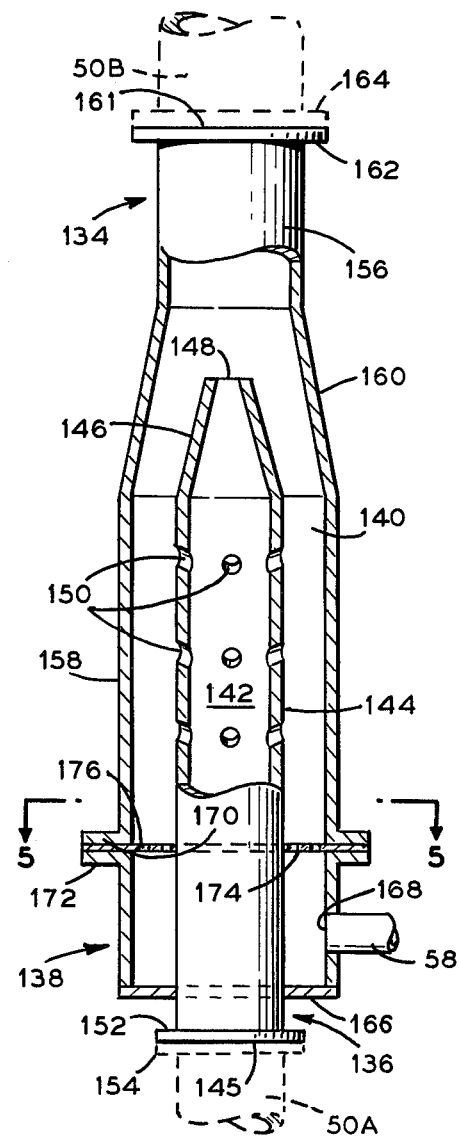
FIG. 4
FIG. 5

DISPERSER

This is a continuation of application Ser. No. 636,859, filed Dec. 2, 1975, now abandoned.

BACKGROUND OF THE INVENTION

The present invention relates to a pneumatic transport system or more particularly to an upright conduit and disperser means for enhancing the conveyance of gas entrained particles by the transport system.

The prior art is exemplified by U.S. Pat. No. 3,689,045 which discloses a pneumatic transport system wherein pulverized coal particles in dense phase fluidized form are discharged into a horizontal conduit to be intercepted by a stream of compressed air which disperses them to dilute phase fluidized form and accelerates them to conveying velocity. This known arrangement has encountered some difficulty in achieving the acceleration and uniformity of particle dispersion required for a smooth transition from dense to dilute phase with recent experience indicating that an uneven transition gives rise to pulsations and congestion of the transport system.

SUMMARY OF THE INVENTION

The present invention discloses a conduit and disperser arrangement which provides positive means for obtaining the acceleration and uniformity of particle dispersion required for a smooth transition from dense to dilute phase in the pneumatic conveyance of gas entrained particles.

Accordingly, there is provided an upright dispenser connected to an upright conduit and comprising inlet and outlet tubular members having at least portions thereof concentrically spaced to form an annular channel therebetween. A plate provides a closure for the bottom of the annular channel. The inlet tubular member defines a central channel for admitting the gas entrained particles to the disperser and includes a constricted section which accelerates the particulates flowing therethrough. An opening is provided at a lower end portion of the outlet tubular member to admit a pressurized fluid to the annular channel to disperse the gas entrained particles exiting from the central channel.

BRIEF DESCRIPTION OF THE DRAWINGS

FIG. 2 is a sectional side view of the disperser depicted in FIG. 1;

FIG. 3 is a sectional plan view taken along line 3—3 of FIG. 2;

FIG. 4 is a sectional side view of an alternate embodiment of the disperser;

FIG. 5 is a sectional plan view taken along line 5—5 of FIG. 4.

DESCRIPTION OF THE PREFERRED EMBODIMENTS

Figure 1:
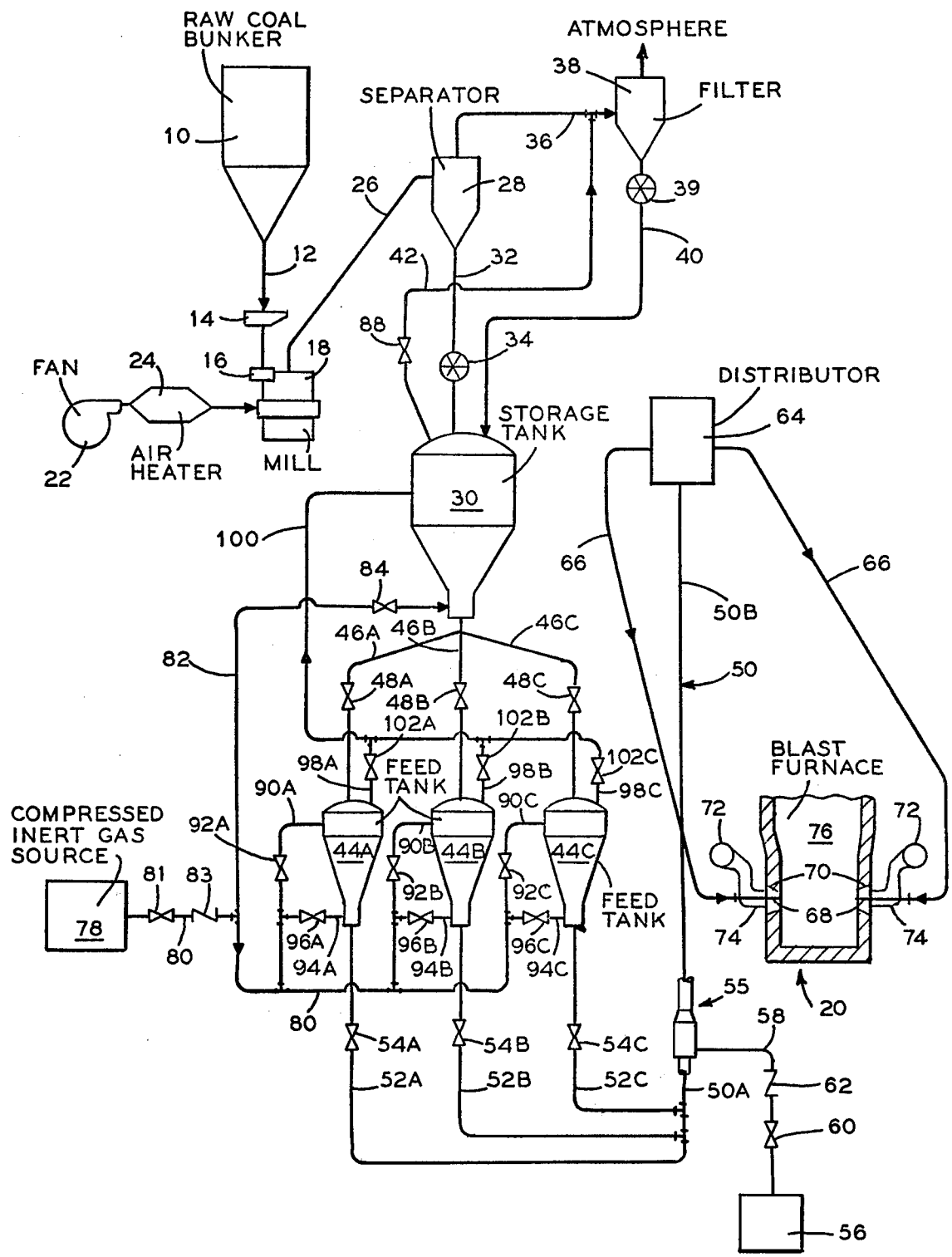
FIG. 1 is a schematic diagram of a blast furnace pulverized fuel preparation and transport system including a disperser embodying the invention.

The disperser is herein described in conjunction with the preparation and conveying of air borne pulverized coal to a blast furnace. It should be recognized, however, that the disclosed disperser may also be used in conjunction with other systems for the distribution of any pneumatically transported particle-form material.

FIG. 1 illustrates a coal preparation and transport system of the character generally disclosed in U.S. Pat. No. 3,689,045 and includes a raw coal bunker 10 which discharges through an outlet conduit 12. A gate valve 14 is installed in the conduit 12 and, when open, allows coal to gravitate to a feeder 16, the latter regulates the flow of coal to a mill 18 in response to system demand. The mill 18 grinds the coal to a consistency suitable for pneumatic transport to a blast furnace 20. Air is supplied to the mill 18 by a primary air fan 22. The air is passed through a heater 24 and is preheated prior to its entry into the mill 18. The heated air passing through the mill 18, dries the pulverized coal and conveys it through an outlet conduit 26 to a cyclone type separator 28. The coal-air mixture entering the separator 28 is centrifugally separated and the coal gravitates to a storage tank 30 via a discharge conduit 32, the latter being provided with a rotary valve 34. The minute coat fines which remain entrained in the primary air are carried along with the air, through a vent conduit 36 to a bag-filter house 38, or other functionally similar apparatus, and collected therein. The cleaned primary air leaving the bag-house 38 is vented to atmosphere while the collected fines gravitate to the storage tank 30 via a discharge conduit 40, the latter being provided with a rotary valve 39.

If desired, a plurality of pulverized coal preparation units can be operated in parallel to supply coal to the storage tank 30 since with multiple units, intermittent operation, maintenance, or emergency servicing of any single unit can be accommodated without necessitating a shutdown of the delivery system. In lieu of spare pulverizing capacity afforded by multiple coal preparation units, an auxiliary storage tank, not shown, can be provided. The auxiliary tank could be suitably connected to the conduits 32 and 40 to receive some or all of the pulverized coal output in excess of the then current needs of the blast furnace 20.

The tank 30 is suitably vented through conduit 42 so as to operate at atmospheric pressure and serves to provide sufficient storage of pulverized coal to supply a plurality of feed tanks 44A, 44B and 44C through corresponding distribution conduits 46A, 46B and 46C. The conduits 46A-C are provided with shutoff valves 48A, 48B and 48C, respectively, which, when open, allow the individual tanks 44A-C to be filled with pulverized coal.

In accordance with the invention, there is provided a vertically oriented pneumatic transport conduit 50 preferably of circular cross-section and comprised of a smaller diameter lower segment 50A and a larger diameter upper segment 50B. The feed tanks 44A-C communicate with the section 50A through corresponding outlet conduits 52A, 52B and 52C provided with respective shutoff valves 54A, 54B and 54C which can be selectively opened to permit coal in dense phase fluidized form to flow from selected tanks 44A-C, one at a time, to the section 50A and closed to isolate, from section 50A, those tanks 44A-C other than the one currently selected to supply pulverized coal to the blast furnace 20.

Inert gas is used for pressurizing and aerating the feed tanks 44A-C and also for aerating the feed tanks 44A-C and also for areating the storage tank 30. The choice of an inert gas is favored since it precludes the possibility of coal ignition within the storage and feed tanks. The inert gas is delivered by a compressed gas source 78 through a supply conduit 80 at a pressure sufficient to maintain coal flow from any given feed tank 44A-C into and through the section 50A at maximum anticipated blast furnace demand rate and against the combined transport system pressure drop and the pressure within the bosh 76. The gas supply conduit 80 includes a control valve 81 and a check valve 83. The aeration of the storage tank 30 is accomplished through conduit 82 which connects the tank 30 with the gas supply conduit 80 and includes a control valve 84. The venting of the storage tank 30 is accomplished through conduit 42 which connects the tank 30 with vent conduit 36 and includes a control valve 88. The pressurization of the feed tanks 44A–C is accomplished through corresponding conduits 90A, 90B, 90C which connect the tanks 44A–C with the gas supply conduit 80, respectively, and include control valves 92A, 92B and 92C. The aeration of the feed tanks 44A–C is accomplished through corresponding conduits 94A, 94B and 94C which connect the tanks 44A–C with the gas supply conduit 80 and respectively include control valves 96A, 96B and 96C. The venting of the feed tanks 44A–C is accomplished through corresponding lines 98A, 98B and 98C which connect the tanks 44A–C with a main vent conduit 100 and respectively include control valves 102A, 102B and 102C. The conduit 100 vents into the storage tank 30.

In accordance with the invention, there is also provided a vertically oriented disperser 55 which is fixedly interposed between the conduit segments 50A–B to effectuate a smooth transition of the coal from dense to dilute phase fluidized form. The pressurized air required for transition of the coal from dilute phase and for conveyance to the blast furnace 20 is supplied to the disperser 55 through a conduit 58 which is connected to a compressed air source 56 and includes a control valve 60 and a check valve 62. The disperser 55 discharges into the section 50B of the transport conduit 50. The section 50B is, in turn, connected for discharge into one or more distributors 64 from which a plurality of feed conduits 66 lead to individual tuyeres 70 of blast furnace 20 in a manner similar to that described in U.S. Pat. No. 3,204,942. The number of distributors 64 as well as the number of tuyeres 70 served by each distributor 64 can be varied according to the requirements of the blast furnace 20. The blast air supplied through the tuyeres 70 is heated in regenerative type stoves, not shown, to a temperature of about 1800° F and passes via a conduit, not shown, to a torus shaped bustle 72 and thence to the individual tuyeres 70 by way of gooseneck conduits 74. The coal-air stream from each feed conduit 66 is directed by corresponding nozzles 68 into the bosh 76 of the blast furnace 20 so that each stream is projected into the high temperature blast air being injected through the corresponding tuyere 70.

In the operation of the system, each of the feed tanks 44A–C is alternately filled, pressurized, and emptied to feed the blast furnace 20 in a predetermined cyclical sequence. For example, when tank 44A is feeding the blast furnace 20, tank 44B is on standby status, filled with coal and pressurized with inert gas, while tank 44C is being filled with coal from storage tank 30.

The aeration valves 96A–C are preferably left open during operation of the system to assure satisfactory fluidization of the coal within the respective tanks 44A–C.

The quantity of pulverized coal being delivered to the blast furnace 20 is regulated through the pressurization valves 92A–C and the vent valves 102A–C associated with whichever tank is feeding coal. In the event that the actual coal flow rate is less than the demand rate, the pressurization valve will open thereby raising the feed tank pressure to increase the coal flow rate. Conversely, should the coal flow rate be greater than the demand rate, the vent valve will open thereby reducing the feed tank pressure to decrease the coal flow rate.

The pressurized air delivered to the disperser 55, to effectuate the transition of the coal from dense to dilute phase fluidized form and to convey the coal from the disperser 55 to the blast furnace 20, is regulated through valve 60 to provide the acceleration and uniformity of particle dispersion required for a smooth transition from dense to dilute phase and to maintain conduit velocities which will assure steady flow and prevent the settling of coal while minimizing the quantity of relatively cold air being thus introduced into the blast furnace 20. The coal in dilute phase fluidized form is conveyed through the transport conduit segment 50B to the distributor 64 which divides it into a plurality of dilute phase effluent streams of substantially equal coal-air density and coal quantity. The coal-air streams leaving the distributor 64 are conveyed through respective conduits 66 to corresponding nozzles 68 for injection into the bosh 76 of blast furnace 20. The hot blast air, which is introduced through the gooseneck conduits 74 into the tuyeres 70, mixes with the dilute phase coal streams to promote rapid combustion of the coal.

Referring to FIGS. 2 and 3, there is shown a main embodiment 55 of the vertically oriented disperser which includes an inlet tubular member 102 and an outlet tubular member 104 having portions thereof concentrically spaced to form an annular channel 106 therebetween. The inlet member 102 defines a central channel 108 for admitting coal in dense phase fluidized form to the disperser 55 and is comprised of cylindrical upper and lower sections 110 and 112 interconnected by a frusto-conical transition section 114 converging in the direction of the upper section 110 with the latter forming the central channel outlet 111. The lower section 112 includes the inlet end 115 of member 102 and has a cross-sectional flow area that is substantially equal to the cross-sectional flow area of the transport conduit segment 50A. The section 112 is provided with a flange 116 which is connected in fluid tight fashion to a like flange 118 on the transport conduit segment 50A. The outlet member 104 is formed of cylindrical upper and lower sections 120 and 122 interconnected by an upwardly convergent frustoconical transition section 124. The upper section 120 includes the outlet end 125 of member 104 and has a cross-sectional flow area that is substantially equal to the cross-section flow area of the transport conduit segment 50B. The section 120 is provided with flange 126 which is connected in fluid tight fashion to a like flange 128 on the transport conduit segment 50B. An annular plate 130 forms a closure along the bottom of channel 106. The plate 130 is seal-welded to the adjoining surfaces of the inlet and outlet members 102 and 104 and is of sufficient thickness to provide the support necessary to maintain the concentric spacing between the members 102 and 104. The lower end of section 122 of the outlet member 104 includes an opening 132 which connects the annular channel 106 with the conduit 58 to admit the pressurized air required for a smooth transition of the coal stream from dense to dilute phase.

In accordance with the invention, the dense phase coal stream is accelerated as it passes through the portion of central channel 108 which corresponds to the constriction formed in the inlet member 102 by the sections 110 and 114.

Referring to FIGS. 4 and 5, there is shown an alternate embodiment 134 of the vertically oriented disperser which includes an inlet tubular member 136 and an outlet tubular member 138 having portions thereof concentrically spaced to form an annular channel 140 therebetween. The inlet member 136 defines a central channel 142 for admitting coal in dense phase fluidized form to the disperser 134 and is comprised of a cylindrical lower section 144 and an upwardly convergent frusto-conical upper section 146, with the latter forming the central channel outlet 148. Additional outlets are provided for the central channel 142 through the perforations or openings 150 located at uniformly spaced levels along the vertical extent of the inlet member 136. For example, each level may be comprised of four circumferentially equispaced outlet openings 150 discharging into the annular channel 140. Each of the openings 150 is upwardly sloped in the direction of discharge and has a central axis which forms an included angle of 45° with the central axis of the inlet member 136. The lower section 144 includes the inlet end 145 of member 136 and has a cross-sectional flow area that is substantially equal to the cross-sectional flow area of the transport conduit 50A. The section 144 is provided with a flange 152 which is connected in fluid tight fashion to a like flange 154 on the transport conduit segment 50A. The outlet member 138 is formed of cylindrical upper and lower sections 156 and 158 interconnected by an upwardly convergent frustoconical transition section 160. The upper section 156 includes the outlet end 161 of member 138 and has a cross-sectional flow area that is substantially equal to the cross-sectional flow area of the transport conduit segment 50B. The section 156 is provided with a flange 162 which is connected in fluid tight fashion to a like flange 164 of the transport conduit segment 50B. An annular plate 166 forms a closure along the bottom of channel 140. The plate 166 is seal-welded to the adjoining surfaces of the inlet and outlet members 136 and 138 and is of sufficient thickness to provide the support necessary to maintain the concentric spacing between the members 136 and 138. The lower end of section 158 of the outlet member 138 includes an opening 168 which connects the annular channel 140 with the conduit 58 to admit the pressurized air required for a smooth transistion of the coal stream from dense to dilute phase. The section 158 also includes a pair of mating flanges 170 and 172 for supporting a perforated annular plate 174 which extends across the channel 140 at a level intermediate the openings 150 and 168. The annular plate 174 includes a plurality of circumferentially staggered perforations or openings 176 which result in a more uniform air distribution.

In accordance with the invention, the dense phase coal stream is accelerated as it passes through the portion of central channel 142 which corresponds to the constriction formed in the inlet member 136 by the section 146.

The operation of the invention as related to the main embodiment has the stream of gas entrained coal particles entering the inlet end 115 of member 102. The coal stream has an approximate density greater than 20 lb./ft.$^3$ and is classified as dense phase for purposes of this transport system. The stream flows through the central channel 108 and is accelerated as it passes through the constriction formed by sections 114 and 110. A controlled quantity of pressurized air is introduced through the opening 132 and flows through the annular channel 106 to intercept the dense phase stream discharging from the central channel outlet 111. The pressurized air uniformly disperses the coal particles while thinning the stream to an approximate density of less than 4 lb./ft.$^3$ which is classified as dilute phase for pusposes of this transport system. The dispersed particles leaving the outlet of member 104 are further accelerated by the pressurized air to achieve flow velocities consistent with positive and continuous transport of coal throughout the system operating range.

The operation of the invention as related to the alternate embodiment is substantially the same as that of the main embodiment with the exception that some of the dense phase stream is discharged into the annular channel 140 through the outlet openings 150, and the pressurized air is distributed as it passes through the perforated plate 174 disposed in the annular channel 140.

While in accordance with the provisions of the statutes there is illustrated and described herein a specific embodiment of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. In combination with a system for conveying gas entrained particles, the system including a disperser comprising tubular-walled inlet and outlet members, the inlet and outlet members having at least portions thereof concentrically disposed and spaced from one another to form an annular channel therebetween, plate means closing the bottom of the annular channel, the inlet member defining a central channel for admitting gas entrained particles to the disperser, the outlet member having at least one wall opening, and the inlet member having a plurality of wall openings located above the wall opening of the outlet member, and means communicating with the outlet member wall opening for supplying a pressurized gas to the annular channel to disperse the gas entrained particles exiting from said channel.

2. The combination according to claim 1 wherein the annular channel includes perforated plate means interposed between said outlet member opening and said inlet member wall openings.

* * * * *

UNITED STATES PATENT AND TRADEMARK OFFICE
CERTIFICATE OF CORRECTION

PATENT NO. : 4,097,092

DATED : June 27, 1978

INVENTOR(S) : Walter Christian Lapple

It is certified that error appears in the above-identified patent and that said Letters Patent are hereby corrected as shown below:

Column 1, line 32, "dispenser" should read --disperser--.

Column 3, line 29, after the word from and before the word dilute insert --dense to--.

Column 4, line 47, "frustoconical" should read --frusto-conical--.

Column 5, line 31, "frustoconical" should read --frusto-conical--.

Column 6, line 55-58, claim 2 should read --2. The combination according to claim 1 wherein the annular channel includes perforated plate means disposed between the outlet member wall opening and the wall openings of said inlet member.--.

Signed and Sealed this

Eighteenth Day of November 1980

[SEAL]

Attest:

SIDNEY A. DIAMOND

Attesting Officer

Commissioner of Patents and Trademarks